INVENTOR.
Charles A. Reichelderfer

United States Patent Office 3,236,454
Patented Feb. 22, 1966

3,236,454
SEALED COMBUSTION CENTRAL HEATING SYSTEM
Charles A. Reichelderfer, Indianapolis, Ind., assignor to Peerless Corporation, Indianapolis, Ind., a corporation of Indiana
Filed Nov. 6, 1963, Ser. No. 321,768
5 Claims. (Cl. 237—53)

This invention relates generally to central heating systems for buildings and more particularly to a central heating system and having a sealed combustion system.

Heretofore, warm-air furnaces employed to distribute heat through ductwork to various rooms of a building, have utilized combustion air taken from within the building. This practice can present problems which, in some instances, are hazardous. By way of example, where gas furnaces are employed, back drafts can extinguish pilot flames and cause entry of combustion products or unburned gas into the building. Also, in some instances, buildings are so tightly sealed that the air in the building available for combustion is limited. This can result in improper combustion or failure of combustion.

The problem of disturbance of pilot flames and possible entry of combustion products into room air has received some attention in space heaters mounted to exterior walls of buildings. In an effort to solve this problem, wall mounted space heaters have been manufactured with combustion systems wherein combustion air is drawn from the outside of the building and combustion products are exhausted to the outside of the building, the combustion system thereby being entirely sealed from the air inside the building. Such systems have been termed sealed combustion systems. However, heretofore, the potential benefits of sealed combustion systems in furnaces for central heating have not been realized.

It is, therefore, a general object of the present invention to provide an improved central heating system.

A further object is to provide a central heating system having a combustion system sealed from the air inside a building.

A still further object is to provide a furnace system of increased safety and reliability.

A further object is to provide a heating system of substantial capacity employing a sealed combustion system.

A still further object is to provide a sealed combustion central heating furnace of compact and yet efficient character.

The full nature of the invention will be understood from the accompanying drawings and the following description and claims.

Figure 1:
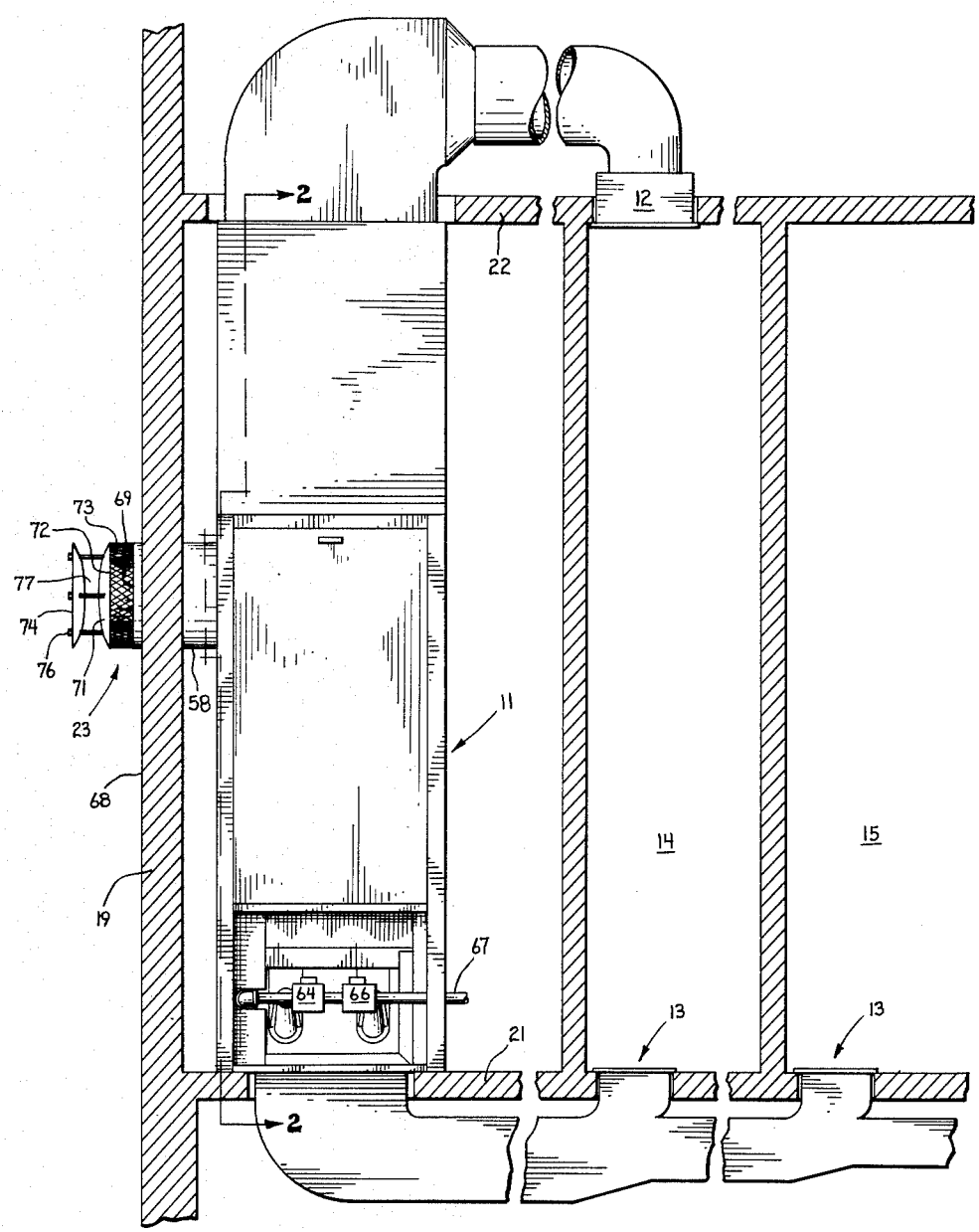
FIG. 1 is an elevational view of the heating system in a building, the building being shown fragmentarily in section.

Referring to the drawings in detail, FIG. 1 shows a warm-air heating system in a building wherein the furnace 11 is operating as a downflow furnace drawing cold air through one or more cold air inlets such as 12 located in the building, heating the air, and discharging it through a number of warm-air registers such as 13 located in various rooms 14 and 15 throughout the building. The wall 19 of the building extending from the floor 21 to the ceiling 22 is an outside wall and a combination air-inlet and exhaust-outlet vent assembly 23 extends through the wall 19 to the outside of the building.

In this example, the blower 16 is mounted above the heat exchanger assembly of the furnace, the blower being conventionally driven by an electric motor 17. The furnace cabinet is typically of sheet metal construction having appropriate reinforcements where necessary and having means therein receiving an air filter 18.

Figure 2:
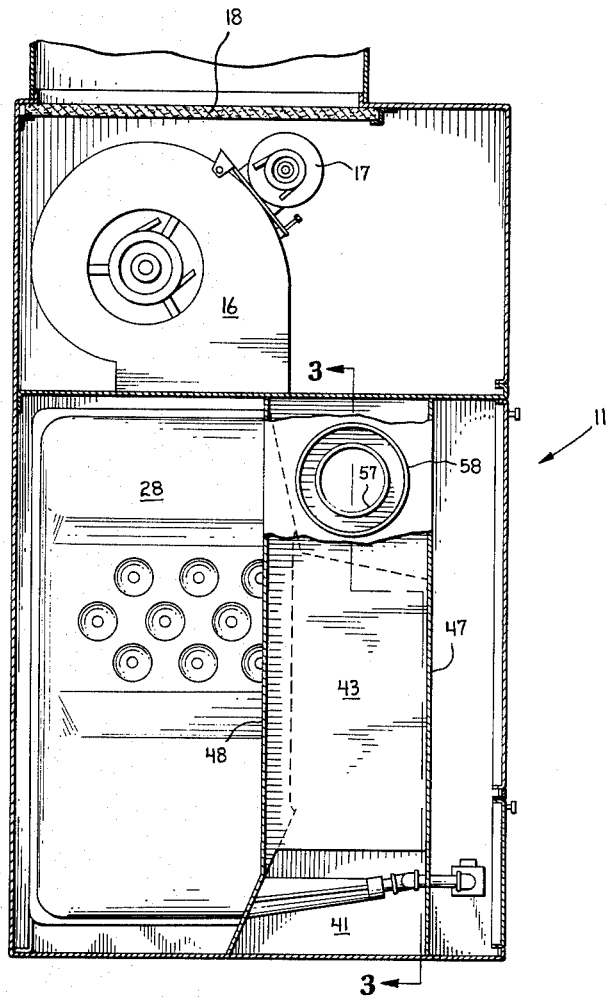
FIG. 2 is a fragmentary sectional view of the installation, the section being taken along the line 2—2 in FIG. 1 and viewed in the direction of the arrows.
Figure 3:
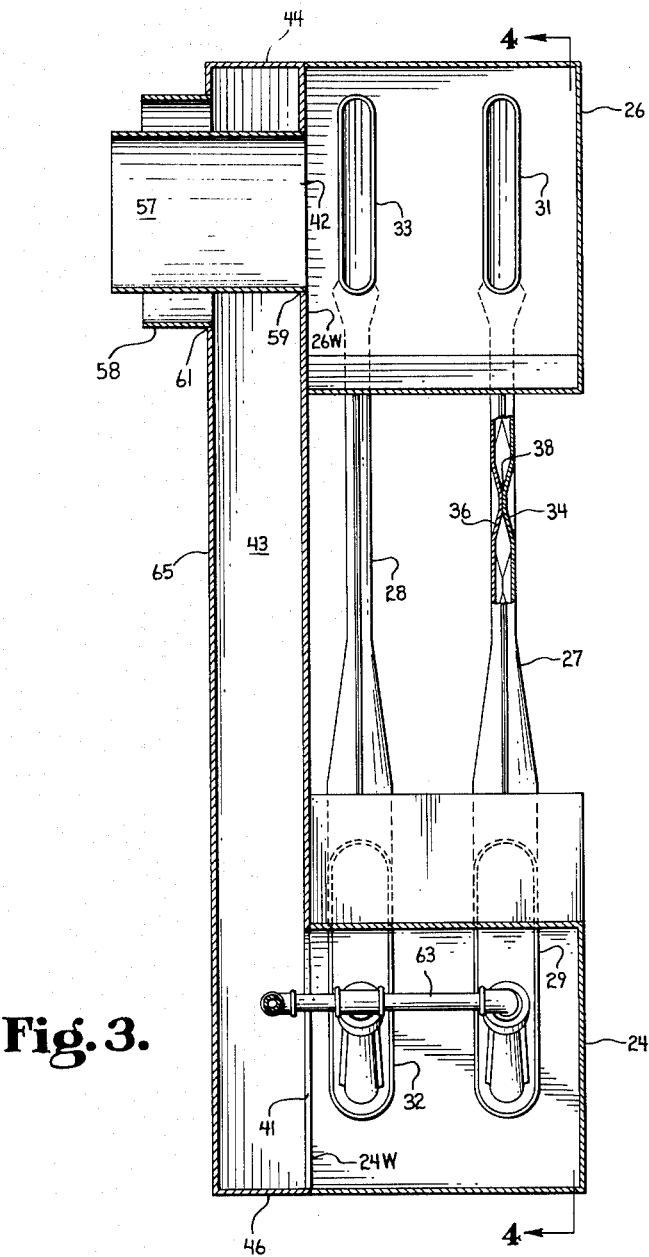
FIG. 3 is a section taken along the line 3—3 in FIG. 2 and viewed in the direction of the arrows.
Figure 4:
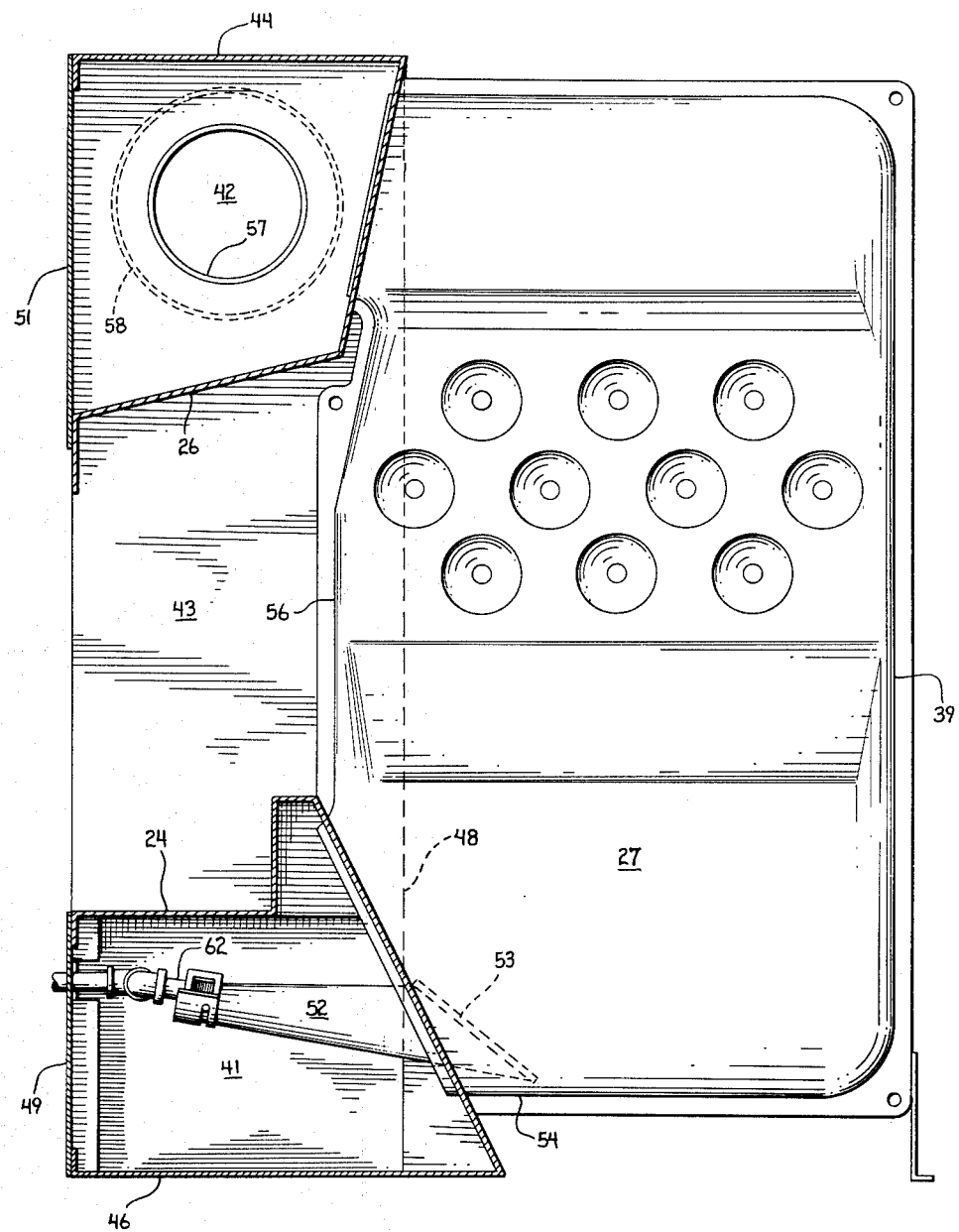
FIG. 4 is a view of the other side of the furnace, this view being taken in the direction of the arrows 4—4 in FIG. 3.

The heat exchanger assembly itself is shown best in FIGS. 2, 3 and 4. It includes an inlet manifold assembly 24 at the bottom and an outlet manifold assembly 26 at the top with heat exchanger tubes 27 and 28 extending from the lower manifold assembly to the upper manifold assembly, these tubes being sealed to the manifold assemblies at their junctions therewith to prevent escape of combustion products. For example, the perimeter of heat exchanger tube 27 is sealed to the lower manifold assembly at 29 and to the upper manifold assembly at 31. Likewise, tube 28 is sealed to the lower manifold assembly around the perimeter of the tube at 32, and the perimeter of the tube 28 is sealed to the upper manifold assembly at 33. Each of the heat exchanger tubes is fabricated from two formed metal sheets, each of the two sheets for one tube having dimples therein engaging with dimples of the other sheet of a tube to provide the desired horizontal spacing between the sheets. For example, one sheet of the tube 27 has dimples 34 therein which abut the dimples 36 in the other sheet of tube 27 at a point 38 equidistant between the sheets.

As is well shown in FIG. 4, the heat exchanger tubes have very little area directly above the inlet manifold assembly and below the outlet manifold assembly. In other words, the heat exchanger tube 27 has essentially a side or end inlet around the perimeter 29 and an end outlet around the perimeter 31, these being substantially vertical and in substantially vertical projection. The heat exchanger tubes extend a substantial horizontal distance from the inlets and outlets to their other vertical margins such as margin 39 of heat exchanger tube 27. The purpose of this construction and the benefits derived therefrom will become apparent as the description proceeds.

At the side 24w of the lower manifold assembly, this being the side facing the wall, there is an opening 41. Likewise at the side 26w of the upper manifold assembly, this being the side facing the building wall, there is an outlet opening 42. A comparatively large vertical duct 43 extends from an upper margin 44 aligned with the upper margin of the upper manifold assembly to a lower margin 46 aligned with the lower margin of the inlet manifold assembly. This duct is well shown in FIG. 2 and has the end walls 47 and 48. It is used for downward conveyance of air for combustion.

While FIG. 3 exposes the interior of both the inlet and outlet manifold assemblies, it should be understood that cover plates are provided for them as shown (in FIG. 4) at 49 for the inlet manifold and 51 for the outlet manifold respectively. Therefore, except for the described openings 41 and 42 in the inlet and outlet manifold assemblies, respectively, these assemblies are open only to the heat exchanger tubes.

For supplying the combustion air to duct 43 and venting exhaust products from the outlet manifold, coaxial pipes 57 and 58 are provided. Inner pipe 57 extends through the upper portion of the duct 43, communicating with the opening 42 in the outlet manifold assembly. This inner pipe is the exhaust pipe and is sealed to the upper manifold assembly around its perimeter 59. The outer pipe 58 is sealed around its perimeter 61 to the outer wall 65 of the duct 43. Typically, the diameter of the inlet pipe 58 with respect to the outlet pipe 57 is in the ratio of 7:5. Combustion air enters through the inlet pipe and descends through the duct 43 to the inlet manifold assembly supplying the air for combustion.

A burner is provided for each of the two heat exchanger tubes. Inasmuch as these are identical, only one will be discussed. In the illustrated example, a single-port inshot burner 52 is mounted in the inlet manifold and the burner port 53 extends into the heat exchanger tube through the inlet thereof and adjacent the bottom margin 54 thereof. The gas fuel supply to the burner 52 is provided by the pipe 62 connected to the supply line 63. The supply line 63 passes through the wall 47 of the duct 43 and through a regulator 64 and gas valve 66 to the main supply line 67.

From the foregoing description, it can readily be seen that when the cover plate 49 is secured to the inlet manifold assembly, and the cover plate 51 is secured to the upper manifold assembly, the combustion system is completely sealed from the interior of the building. The combustion air is drawn from outside the building and passes through the vent assembly and down the duct 43. Combustion products pass upwardly through the heat exchanger tubes and into the outlet manifold from which they depart to the outside of the building through the exhaust pipe 57.

Referring further to the vent assembly, the inlet pipe 58 extends only very slightly outside the outer surface 68 of the building wall. In fact, the outer margin 69 of the inlet pipe may be flush with the wall, if desired. The exhaust pipe 57 extends somewhat farther out. A plate 71 is secured to the outer end 72 of the exhaust pipe 57. This plate is disposed in horizontally spaced relation to the margin 69 of the inlet pipe, and a screen 73 is provided around the inlet pipe to prevent entry of animals and foreign matter into the cold air inlet. A second plate 74 is mounted to the studs 76 secured to the plate 71 and is thereby disposed in horizontally spaced relation thereto. This provides an annular exhaust outlet 77. It is to be noted that the plates are convex in form providing a venturi action at the mouth of the exhaust pipe to achieve better removal of combustion products.

Several features of this invention make possible the sealed combustion system in a high capacity furnace. One of those features being the arrangement of the burners and the heat exchanger tubes. As noted above, the burner ports extend into the heat exchanger tubes through the inlets thereof and adjacent the bottom margins thereof. As a result of this arrangement, and referring to tube 27, for example, the fire sweeps along the bottom margin of the tube to the end margin 39 and upwardly through the tube. Consequently, the region in the heat exchanger tube around the vertical margin 56 is cool by comparison with the major area of the heat exchanger. Moreover, as shown in FIG. 3, the heat exchanger tubes themselves are not in contact with the combustion air supply duct 43.

Another feature can be seen by comparing FIGS. 2 and 4 and noting the relationship of the vertical margin 56 of the heat exchanger tube to the margin 48 of the duct 43. It is apparent that there is very little overlap in horizontal projection and, as mentioned above, there is no direct contact between the heat exchanger and the duct.

The above described features are quite effective to minimize heat transfer to the combustion air supply duct. Moreover, because of the extreme short coupling between the cold air inlet opening 69 and the cold air duct 43 of the furnace, there is little chance for heating of the incoming combustion air by the exhaust pipe extending through the center of the inlet pipe.

Because of novel features of this invention, a completely adequate supply of combustion air for furnaces of substantial heating capacity is obtained according to the present invention, without the necessity of using insulating materials to insulate the incoming air pipes and without the necessity of using power for moving the combustion air.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. The combination comprising: a sealed combustion central heating furnace; a building having a plurality of rooms with individual hot air registers in each room of said plurality and having an inlet register in a room thereof, said furnace having a room heating air inlet and a heated air outlet; first pipe means coupling said inlet to said inlet register; second pipe means coupling said outlet to hot air registers in various rooms of the building; blower means disposed between said inlet and outlet for forcing air through the registers and for forcing the air in a path through said furnace; heat exchanger means disposed between said inlet and outlet, said heat exchanger means having tubes disposed in spaced relation to each other and in the said air path between said inlet and outlet, each of said heat exchanger tubes having front and rear end margins with the front end margin disposed a substantial horizontal distance from the rear end margin, and each heat exchanger tube having side walls disposed in comparatively closely spaced relation, and each tube having upper and lower margins with the vertical dimension between said upper and lower margins being greater than any horizontal dimension of the said tube, and each tube having a combustion material inlet aperture in the front end margin adjacent the lower margin thereof and having a combustion product outlet aperture in the front end margin adjacent an upper margin of the heat exchanger tube, said heat exchanger tube inlet aperture and outlet aperture being disposed in substantially vertical projection; an inlet manifold communicating with said heat exchanger tube inlet apertures and disposed substantially out of the said air path; and a combustion product outlet manifold communicating with the heat exchanger tube outlet apertures and disposed substantially out of the said air path and a substantial vertical distance above said inlet manifold; single part inshot burners extending generally horizontally in said inlet manifold, each burner discharging into one of said tubes adjacent the inlet aperture and directing flame along the lower inner margin thereof to the inner rear margin thereof; a vertically extending combustion air inlet duct extending between said inlet and outlet manifolds substantially out of said air path and substantially out of line with frontal and sideward projections of the area of said heat exchanger tubes to minimize heat transmission to said duct from said tubes, the interior of said duct communicating with said inlet manifold and isolated from said outlet manifold; a cylindrical combustion air inlet pipe of short length secured to said inlet duct adjacent an upper margin thereof and communicating with the interior of said duct to admit air to said duct, said inlet pipe extending through an exterior wall of said building and admitting outside air into said duct through said inlet pipe; and a cylindrical exhaust pipe coaxial with and extending through the center of said inlet pipe and communicating with the interior of said outlet manifold, the diameter of said inlet pipe with respect to the diameter of the exhaust pipe being in the ratio of 7:5, and said exhaust pipe having a domed deflector plate at its outer marginal edge disposed in horizontally spaced relation to the outer margin of said inlet pipe, to provide an annular air inlet for combustion air; and a second domed plate disposed in horizontally spaced relationship to said first domed plate and providing an annular outlet for combustion products, the convex surfaces of said domed plates being in facing relationship to provide a venturi effect to facilitate scavenging of combustion products.

2. In a sealed combustion central heating furnace for a building, the combination comprising: heat exchanger tubes disposed in spaced relation to each other, each of said heat exchanger tubes having front and rear end margins and each tube having said walls disposed in comparatively closely spaced relation and each tube having upper and lower margins, with the vertical dimension between said upper and lower margins being greater than any horizontal dimension of the said tube, and each tube having combustion material inlet means in the front end margin adjacent the lower margin thereof and having combustion product outlet means in the front end margin adjacent an upper margin of the heat exchanger tube; an inlet manifold communicating with said heat exchanger tube inlet means and disposed principally horizontally in front of the tubes; and a combustion product outlet manifold communicating with the heat exchanger tube outlet means and disposed principally horizontally in front of the tubes; a combustion air inlet duct extending vertically downward from a point at the side of said outlet manifold to a point at the side of said inlet manifold, said tubes being located at different horizontal distances from said duct, and said duct being connected to said inlet manifold and disposed principally in front of a vertical plane through said inlet and outlet means, and out of line with a sideward projection of the area of the side walls of said tubes, to thereby minimize heat transmission from said tubes to said duct, the interior of said duct communicating with said inlet manifold through the side of said inlet manifold and isolated from said outlet manifold; a combustion air inlet pipe of short length secured to said inlet duct adjacent an upper margin thereof and communicating with the interior of said duct to admit air to said duct; and an exhaust pipe extending through said inlet pipe and communicating with the interior of said outlet manifold.

3. The combination of claim 2 and further comprising: inshot burner means disposed in said inlet manifold and discharging into said tubes in a direction toward the rear end margin opposite said inlet means and thereby causing the flame produced thereby to sweep along the lower margins of said tubes from an area adjacent said inlet means toward the rear margins and then upwardly in the tubes.

4. In a sealed combustion central heating system for a building, the combination comprising: heat exchanger tubes disposed in spaced relation to each other, each of said heat exchanger tubes having front and rear horizontally spaced end margins and each tube having side walls disposed in comparatively closely spaced relation and each tube having upper and lower margins, and each tube having combustion material inlet means in the front end margin adjacent the lower margin thereof and having combustion product outlet means in the front end margin adjacent an upper margin of the heat exchanger tube; an inlet manifold extending across the front end margins of said tubes at said inlet means and communicating with said heat exchanger tube inlet means; and a combustion product outlet manifold extending across the front end margins of said tubes at said outlet means and communicating with the heat exchanger tube outlet means; a vertically extending combustion air inlet duct connected to the side of said inlet manifold and to the side of said outlet manifold and horizontally offset from a horizontal line extending through the front and rear-end margins of the tube nearest to the inlet duct, and said duct being in front of a vertical plane passing through said inlet means and normal to said horizontal line to minimize heat transmission to said duct from said heat exchanger tubes, the interior of said duct communicating with said inlet manifold and isolated from said outlet manifold; single port inshot burners disposed in said inlet manifold, each burner being disposed with its discharge port projecting into the inlet of one of said tubes and the orientation of each burner causing the flame produced thereby to sweep along the bottom margin of the tube to the rear end margin and then upwardly in the tube; a combustion air inlet pipe of short length secured to said inlet duct adjacent an upper margin thereof and communicating with the interior of said duct to admit air to said duct and an exhaust pipe extending in the same direction as said inlet pipe and communicating with the interior of said outlet manifold.

5. In a sealed combustion central heating system for a building, the combination comprising: heat exchanger tubes disposed in spaced relation to each other, each of said heat exchanger tubes having front and rear horizontally-spaced end margins and each tube having side walls disposed in comparatively closely spaced relation and each tube having upper and lower margins, and each tube having combustion material inlet means in the front end margin adjacent the lower margin thereof and having combustion product outlet means in the front end margin adjacent an upper margin of the heat exchanger tube; said heat exchanger tube inlet means and outlet means being disposed in substantially vertical projection; an inlet manifold extending across the front end margins of said tubes at said inlet means and communicating with said heat exchanger tube inlet means; and a combustion product outlet manifold extending across the front end margins of said tubes at said outlet means and communicating with the heat exchanger tube outlet means; inshot burner means producing flames sweeping along the inner lower margins of said tubes to the rear margins thereof and then upwardly and causing portions of said tubes in front of a vertical plane passing through all of said inlet and outlet means to be cool by comparison with portions of said tubes behind said plane; a vertically extending combustion air inlet duct extending between the side margins of said inlet and outlet manifolds, said duct being located different horizontal distances from different ones of said tubes, and horizontally spaced from all of said tubes, said duct being horizontally offset from each horizontal line which can be drawn passing through both the front and rear end margins of the tube nearest said duct, and said duct being in front of said plane, whereby heat transmission from said tubes to said duct is minimized, the interior of said duct communicating with said inlet manifold and isolated from said outlet manifold; a combustion air inlet pipe of short length secured to said inlet duct adjacent an upper margin thereof and communicating with the interior of said duct to admit air to said duct; and an exhaust pipe extending through said inlet pipe and communicating with the interior of said outlet manifold.

References Cited by the Examiner
UNITED STATES PATENTS

| | | | |
|---|---|---|---|
| 2,620,786 | 12/1952 | Mueller | 126—110 |
| 2,808,047 | 10/1957 | Jaye et al. | 126—110 X |
| 3,064,638 | 11/1962 | Bauer | 126—110 |
| 3,091,223 | 5/1963 | Vitale | 126—85 |
| 3,120,225 | 2/1964 | Stark et al. | 126—110 |
| 3,140,706 | 7/1964 | Block et al. | 126—110 |

FREDERICK L. MATTESON, JR., *Primary Examiner.*

JAMES W. WESTHAVER, *Examiner.*